(12) United States Patent
Carmichael et al.

(10) Patent No.: US 11,053,968 B1
(45) Date of Patent: *Jul. 6, 2021

(54) BLIND BOLT

(71) Applicant: Allfasteners USA, LLC, Medina, OH (US)

(72) Inventors: Bruce A. Carmichael, Bay Village, OH (US); Michael Strange, Medina, OH (US)

(73) Assignee: Allfasteners USA, LLC, Medina, OH (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/016,010

(22) Filed: Jun. 22, 2018

Related U.S. Application Data

(63) Continuation of application No. 14/957,934, filed on Dec. 3, 2015, now Pat. No. 10,018,212, which is a
(Continued)

(51) Int. Cl.
*F16B 13/06* (2006.01)

(52) U.S. Cl.
CPC .................. *F16B 13/063* (2013.01)

(58) Field of Classification Search
CPC ...... F16B 13/063; F16B 5/0208; F16B 21/04; F16B 41/002; F16B 13/066;
(Continued)

(56) References Cited

U.S. PATENT DOCUMENTS

| 1,838,134 A | 12/1931 | Cozzens |
| 2,431,342 A | 11/1947 | Perkins et al. |

(Continued)

FOREIGN PATENT DOCUMENTS

| EP | 1878926 A1 | 1/2008 |
| WO | 0019113 A1 | 4/2000 |
| WO | 0028224 A1 | 5/2000 |

OTHER PUBLICATIONS

Answer of Defendant, Acme Operations Pty. Ltd.—*Allfasteners USA, LLC* vs. *Acme Operations Pty., Ltd. d/b/a Ajax Engineered Fasteners, et al.*, US District Court Central District California Case No. 2:18-cv-06929—Answer Filed Nov. 8, 2018.
(Continued)

*Primary Examiner* — Lee A Holly
(74) *Attorney, Agent, or Firm* — Luedeka Neely Group, P.C.

(57) ABSTRACT

A blind bolt and tool is used for fastening a bolt through a hole in a structure when only one side of the structure is accessible. A receiver is formed on the tip end of a bolt shaft opposite from a bolt head. Internal threads are formed within the receiver proximate an outward end, and a hex socket is formed in the inward end of the receiver. External threads and a guide are formed on a tip of the tool, and the external threads mate with the internal threads in the receiver to hold the bolt during installation. A hex key on one end of the tool engages the hex socket in the receiver so that the tool may impose a torque on the bolt when a nut is being tightened on the bolt. In another embodiment, a splined tip is formed on the end of the bolt. The tip is designed to shear off when a sufficient torque is applied. Also, a shim is configured to fit between structures held together by the blind bolt.

9 Claims, 14 Drawing Sheets

Related U.S. Application Data continuation of application No. 14/734,271, filed on Jun. 9, 2015, now Pat. No. 9,694,478, which is a continuation-in-part of application No. 14/727,021, filed on Jun. 1, 2015, now Pat. No. 9,683,593.

(60) Provisional application No. 62/102,920, filed on Jan. 13, 2015, provisional application No. 62/079,921, filed on Nov. 14, 2014, provisional application No. 62/069,797, filed on Oct. 28, 2014, provisional application No. 62/009,357, filed on Jun. 9, 2014.

(58) Field of Classification Search
CPC ... F16B 13/0833; F16B 13/065; B21J 15/043; Y10T 29/5377; Y10T 29/5373; Y10T 29/53748; B25B 13/48
See application file for complete search history.

(56) References Cited

U.S. PATENT DOCUMENTS

| | | | |
|---|---|---|---|
| 2,511,051 A | 6/1950 | Dzus | |
| 2,632,354 A | 3/1953 | Black | |
| 2,746,022 A | 5/1956 | Gilbert | |
| 2,761,108 A | 8/1956 | Jackson et al. | |
| 3,129,630 A | 4/1964 | Wing et al. | |
| 3,400,627 A | 9/1968 | Raynovich | |
| 3,594,876 A | 7/1971 | Gunther | |
| 3,789,705 A | 2/1974 | Naslund | |
| 4,022,099 A | 5/1977 | Ballantyne | |
| D246,346 S | 11/1977 | Strunk | |
| 4,194,858 A | 3/1980 | Evans | |
| 4,293,259 A | 10/1981 | Liebig | |
| 4,315,708 A * | 2/1982 | Liebig | F16B 13/0833 |
| | | | 411/341 |
| 4,613,264 A * | 9/1986 | McIntyre | F16B 13/045 |
| | | | 411/42 |
| 4,637,764 A | 1/1987 | Imai | |
| 4,776,089 A | 10/1988 | Schoenwetter et al. | |
| 4,809,421 A | 3/1989 | Justice | |
| 4,836,062 A | 6/1989 | Latorre | |
| 5,651,649 A | 7/1997 | Sadri et al. | |
| 5,953,965 A | 9/1999 | Kaneyama et al. | |
| D423,909 S | 5/2000 | Hartin | |
| 6,058,671 A | 5/2000 | Strickland | |
| 6,247,883 B1 | 6/2001 | Monserratt | |
| 6,254,323 B1 | 7/2001 | Junkers | |
| 6,533,516 B2 | 3/2003 | Lemelin | |
| 7,108,568 B2 | 9/2006 | Jazowski et al. | |
| 7,137,329 B1 | 11/2006 | Moser | |
| 7,204,667 B2 | 4/2007 | Uno et al. | |
| 7,310,916 B2 | 12/2007 | Gorman | |
| 7,347,791 B1 | 3/2008 | Watkins et al. | |
| 7,373,709 B2 * | 5/2008 | Fernando | B25B 13/48 |
| | | | 29/243 |
| 7,905,069 B1 | 3/2011 | Lockwood | |
| 8,037,788 B2 | 10/2011 | Proper | |
| 8,137,042 B2 | 3/2012 | Severns | |
| 8,162,577 B2 * | 4/2012 | Moore | F16B 13/065 |
| | | | 411/60.1 |
| 8,490,517 B2 | 7/2013 | MacArthur et al. | |
| 8,517,650 B2 | 8/2013 | Niklewicz et al. | |
| 8,555,481 B2 | 10/2013 | Porter et al. | |
| 9,145,908 B2 | 9/2015 | Gill et al. | |
| 2013/0156525 A1 * | 6/2013 | Gill | F16B 13/066 |
| | | | 411/32 |

OTHER PUBLICATIONS

Answer of Defendant, Ira Svendsgaard and Associates, Inc.—*Allfasteners USA, LLC* vs. *Acme Operations Pty., Ltd. d/b/a Ajax Engineered Fasteners, et al.*, US District Court Central District California Case No. 2:18-cv-06929—Answer Filed Nov. 8, 2018.

Complaint for Patent Infringement—*Allfasteners USA, LLC* vs. *Acme Operations Pty., Ltd. d/b/a Ajax Engineered Fasteners, et al.*, US District Court Central District California Case No. 2:18-cv-06929—Filed Aug. 13, 2018.

Counterclaim of Defendant, Acme Operations Pty. Ltd.—*Allfasteners USA, LLC* vs. *Acme Operations Pty., Ltd. d/b/a Ajax Engineered Fasteners, et al.*, US District Court Central District California Case No. 2:18-cv-06929—Counterclaim Filed Nov. 8, 2018.

Counterclaim of Ira Svendsgaard and Associates, Inc..—*Allfasteners USA, LLC* vs. *Acme Operations Pty., Ltd. d/b/a Ajax Engineered Fasteners, et al.*, US District Court Central District California Case No. 2:18-cv-06929—Counterclaim Filed Nov. 8, 2018.

Peel/plate GmbH, Vario-plate shim plates, http://www.peel-plate.com, Accessed Mar. 5, 2015.

SKF,Shims for Accurate Vertical Machinery Alignment, http://www.skf.com, Accessed Mar. 5, 2015.

Steel Shelving USA, 12 Gauge Shim for Floor Anchor Plate/ Rousseau Spider Shelving, http://www.steelshelving-USA.com, Accessed Mar. 5, 2015.

Ajax Bolt drawing with neoprene washer dated Dec. 2013.

AllFasteners Newsletter ad dated Oct. 2014 showing bolt with rubber gasket.

Complaint dated Jul. 9, 2015 in Case No. 1:15-cv-1366, Northern District Ohio.

Joint Invalidity Contentions of Defendants in Case No. 2:18-cv-06929, Central District California.

Defendant Ira Svendsgaard & Associates Final Invalidity Contentions in Case No. 2:18-cv-06929, Central District California.

Defendant Ira Svendsgaard & Associates First Supplemental Final Invalidity Contentions in Case No. 2:18-cv-06929, Central District California.

\* cited by examiner

BLIND BOLT

FIELD

This invention relates to the field of fasteners and fastener drive tools more particularly, this invention relates to blind bolts and drive tools for torquing blind bolts.

CROSS REFERENCE TO RELATED APPLICATIONS

This application claims priority to and makes reference to U.S. non-provisional application Ser. No. 14/957,934, filed Dec. 3, 2015, now U.S. Pat. No. 10,018,212 which is a continuation of application Ser. No. 14/734,271, filed Jun. 9, 2015, now U.S. Pat. No. 9,694,478, and application Ser. No. 14/957,934 claims priority to provisional application 62/109,920; and application Ser. No. 14/734,271 is a continuation-in-part of application Ser. No. 14/727,021, filed Jun. 1, 2015, which claims priority to provisional application 62/102,920, filed Jan. 13, 2015, provisional application 62/079,921, filed Nov. 14, 2014, provisional application 62/069,797, filed Oct. 28, 2014, and provisional application 62/009,357, filed Jun. 9, 2014, and which is a continuation-in-part of Ser. No. 14/705,185, filed May 6, 2015, which claims priority to provisional application 62/000,225, filed May 19, 2014. Each of the aforementioned applications is incorporated by reference herein as if fully and completely copied into this document.

BACKGROUND

Large construction structures often need to be scaled for various purposes. For example, large towers are often scaled to change or improve equipment, modify or reinforce the structure of the tower, and maintain the tower. In one particular type of tower, the cell phone tower, new innovations and increased demands have created a need to add additional weight to the cell phone tower. Often, it is necessary or desirable to reinforce the cell phone tower to accommodate the additional weight. One technique for reinforcement uses blind bolts. Typically, the blind bolt is used for securing reinforcing the structure or to add additional equipment to the original tower. Of course blind bolts may be used for a variety of different purposes on a variety of different structures.

A blind bolt is inserted into a hole provided in the structure and the far end of the bolt is secured within the structure. Some blind bolts may have an expanding structure on the far end of the bolt that will expand and prevent the bolt from sliding back through the hole. The expanding structure is a "bolt head" as that term is used herein. The head of the blind bolt is inserted into a bore terminating at an inaccessible area. A folded washer is inserted through the hole in a folded orientation. On the other side of the hole, the washer is unfolded and placed on the bolt. The washer will then not pass through the hole in the structure and the bolt head will not pass through the hole in the washer. Thus, the far end of the blind bolt is secured within the structure. Once the far end of the blind bolt is secured, a nut is placed on the near end of the blind bolt and the nut is tightened to secure the blind bolt to the structure. A tool may be provided for holding the blind bolt as the nut is tightened.

While prior bolt and tool hardware has worked reasonably well, a need exists for an easier, faster and more durable blind bolt and tool combination.

SUMMARY

An improved blind bolt and tool combination is lightweight, fast and simple to use, and is durable. It is particularly useful for applying equipment and support structure to a cell tower in demanding environments.

In accordance with one embodiment of the present invention, a blind bolt and tool is used for fastening a bolt through a hole in a structure when only one side of the structure is accessible. A blind bolt is provided with a bolt head mounted on a bolt shaft, which extends from the bolt head to a tip end of the shaft. Bolt threads are formed on the bolt shaft and a receiver is formed on the tip end of the bolt shaft opposite from the bolt head. The receiver includes an outward end disposed proximate to the tip end of the bolt shaft. It also includes an inward end disposed within the bolt shaft toward the bolt head from the tip end. In addition, the blind bolt also includes internal receiver threads formed proximate the outward end of the receiver; a driven structure formed in the inward end of the receiver, and a plurality of splines formed on an outer surface of the tip end. These splines are configured to engage with an inner socket of a tension control wrench. Further the tip end of the bolt shaft is configured to shear away from the bolt when a predetermined amount of torque is applied to the plurality of splines on the tip end.

In accordance with another aspect of the invention, a tool is particularly designed for holding the bolt while it is inserted through a hole in the structure and for holding the bolt while a nut is being tightened on the bolt. The tool also applies a torque to the bolt in a direction opposite to the rotation of the nut on the bolt.

The tool includes an elongate body having a forward end and a rearward end. A tip is formed on the forward end of the elongate tool body, and external threads are formed on the tip dimensioned to mate with the internal threads formed in the receiver. The external threads are disposed on the rearward end of the tip, which is the end proximate the forward end of the elongate tool body. A key is disposed on the rearward end of the elongate tool body and is dimensioned and configured to fit within the receiver. A drive surface is formed on the key configured to mate with and engage the driven structure in the receiver. The drive surface and the driven structure interact so that the tool may impose a torque on the bolt through the driven surface of the receiver. In one embodiment, the driven structure is a hexagon shaped socket and the key is a hexagon shaped key dimensioned to mate with the socket. It will be understood that the key and socket may be other polygon shapes or other shapes so long as the shapes allow a torque to be applied to the bolt by the key.

In one embodiment the key includes an elongate mounting shaft that is mounted in the center of the elongate tool body. When the key extends out of the tool body, a bend is provided in the key and a polygon shaped tip extends from the end of the bend. Thus, the polygon shaped tip is disposed obliquely with respect to the elongate shape of the body. For example, the polygon shaped tip may be disposed in a direction substantially perpendicular to the elongate shape of the body. Thus, the length of the body can be used as a lever to apply torque through the receiver to the bolt.

To facilitate the operation of the tool, a guide is formed on the end of the tip. The guide is dimensioned to slide through the internal threads within the receiver. The guide then engages the driven structure within the inner end of the receiver. Thus, the guide aligns the tool with the bolt before the outer threads on the tip engage the inner threads within the receiver. The guide positions the tool so that it easily threads the tip into the receiver without cross threading. The threads on the receiver and the tip are positioned and dimensioned such that the bolt is very quickly mounted on the tool. Once the threads engage, the bolt is fully tightened on the tool by a small rotation of the tool relative to the bolt, preferably less than one full rotation. For example, the bolt may be tightened with a relative rotation of only 180°, one half of a full rotation.

In operation, the tool and bolt are used by first mounting the bolt on the tool. The guide is inserted into the receiver and then the bolt is rotated relative to the tool for approximately 180° to thereby tighten and secure the bolt to the tool. The far end of the bolt is then inserted through a hole in a structure while the bolt is still held by the tip of the tool. Once the bolt is properly positioned within the hole and the far end of the bolt is secured, a washer and a nut are placed on the near end of the bolt. For example, the washer and the nut may have been placed on the tool prior to mounting the bolt on the tool. Then, when the bolt is in place the washer slides onto the bolt followed by the nut that is moved from the tool until it engages the bolt. The nut is then threaded onto the bolt while the tip continues to hold the bolt. At some point, the nut begins to tighten on the bolt and will tend to rotate the bolt in a direction that will unscrew the tool tip from the receiver. At such point, the user will unscrew the tip of the tool from the receiver and then insert the key into the receiver. The key is made of a hardened material that is durable and strong. In one embodiment, the key is disposed at an angle of 90° with respect to the length of the tool and is disposed on one end of the tool. Thus, when the key is inserted into the receiver, the entire length of the tool may be used as a lever to apply torque to the bolt through the key and receiver. Using the tool to hold the bolt, the user applies a wrench to the nut and applies a torque in an opposite direction to the torque applied by the tool. After a desired level of torque is applied to the nut, the tool is removed by simply sliding the key out of the socket.

In another aspect, the present disclosure provides a blind bolt assembly for fastening a blind bolt in a hole in a structure, wherein only one side of the structure is accessible. According to one embodiment, the blind bolt assembly includes a blind bolt, a foldable split washer, a shear sleeve, a spring, at least one non-folding washer, and a nut. The blind bolt, in turn, includes at least a bolt head, a bolt shaft extending from the bolt head to a tip end of the shaft, bolt threads formed on the bolt shaft, and a receiver formed in the tip end of the bolt shaft—the receiver having an outward end disposed proximate to the tip end of the bolt shaft and having an inward end disposed within the bolt shaft toward the bolt head from the tip end. In addition, the blind bolt also includes receiver threads formed proximate the outward end of the receiver; and a driven structure formed in the inward end of the receiver.

The foldable split washer, the shear sleeve, the spring, and the at least one non-folding washer are each coaxially disposed about the bolt shaft. The nut is threaded onto the bolt shaft. When the blind bolt assembly is attached to the structure, the bolt extends through a hole in the structure. The bolt head and the foldable split washer are disposed on an inaccessible side of the structure. At least a portion of the shear sleeve and the spring are disposed within the hole in the structure. Finally, the nut and the at least one non-folding washer are disposed on an accessible side of the structure.

In certain embodiments of the blind bolt assembly, the at least one non-folding washer preferably includes a flat washer, a direct tension indicator washer, and a lock washer.

In certain embodiments of the blind bolt assembly, the shear sleeve preferably includes a spring retainer formed on one end of the shear sleeve. An end of the spring is fastened to the shear sleeve by the spring retainer.

In certain embodiments of the blind bolt assembly, the foldable split washer includes first and second semicircular half washers, and each half washer has first and second ends. The foldable split washer also includes a flexible foldable membrane securing the two first ends together and securing the two second ends together thereby forming the foldable split washer.

In certain embodiments of the blind bolt assembly, the aforementioned blind bolt also includes a plurality of splines formed on an outer surface of the tip end. These splines are configured to engage with an inner socket of a tension control wrench. Further the tip end of the bolt shaft is configured to shear away from the bolt when a predetermined amount of torque is applied to the plurality of splines on the tip end.

In accordance with another aspect, the present disclosure provides a shim positioned between a reinforcing plate held to a pole by blind bolts. The shims ensure that the plate remains relatively straight even if the pole has variations in its surface configuration. The shim includes a breakaway tab that is held by the user to insert the shim into place. In addition, the shim includes a slot that is dimensioned to encompass and surround the blind bolt once the shim is inserted fully into position behind the plate.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
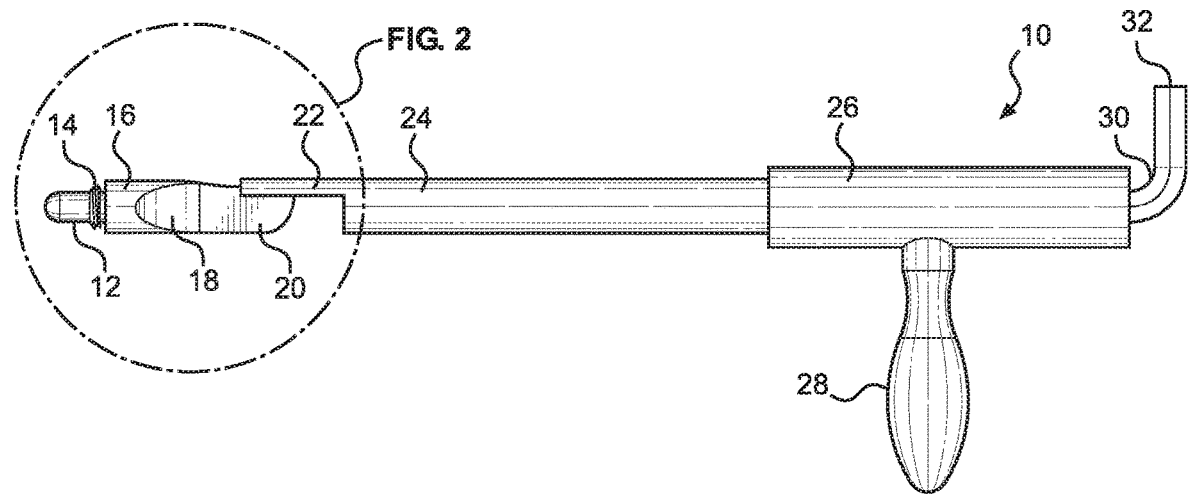
FIG. 1 is a side perspective view of a tool used to hold and mount a blind bolt.
Figure 2:
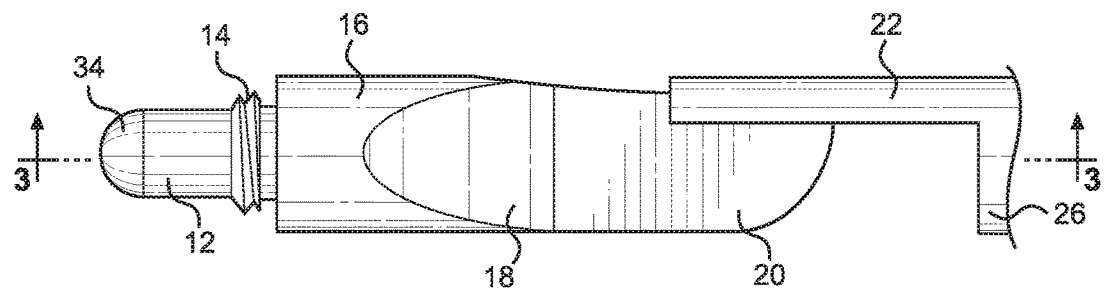
FIG. 2 is a perspective enlarged detailed view of the forward end of the tool.
Figure 3:
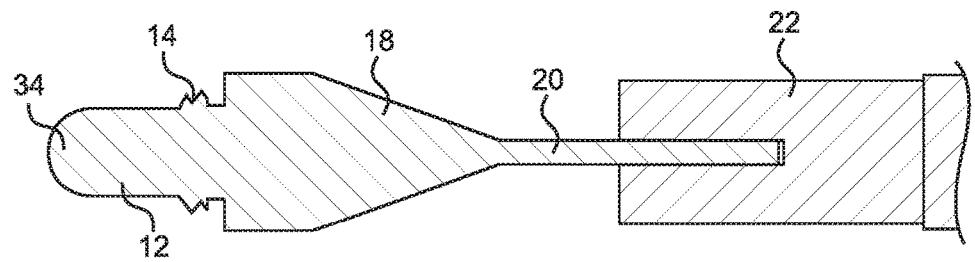
FIG. 3 is a cross-sectional view of the forward end of the tool.

Referring now to FIG. 1, a perspective view of the tool 10 is shown. It is used to mount the blind bolt 40 shown in FIGS. 4-6. A perspective enlarged view of one end of the tool is shown in FIG. 2 and a cross-sectional view taken through line C-C is shown in FIG. 3. Referring collectively to FIGS. 1-3, the tool 10 includes a guide 12 formed on the forward end of the tool. The guide 12 includes a rounded point 34 and both of these elements will help guide the tool 10 into a receiver of the blind bolt 40.

Toward the base end of the guide 12 and adjacent the forward end 16 of the tool 10, threads 14 are disposed on the guide and are used to the secure the bolt to the tool as well be described hereinafter. The forward end 16 of the tool 10 is cylindrical in shape and is dimensioned smaller than the threads of the blind bolt 40. Moving rearwardly from forward end 16, a triangular portion 18 tapers down to a flat portion 20 that is connected to a semi-cylindrical portion 22. These areas of the tool are used to install a folded washer.

The main body of the tool 10 includes a cylindrical mid region 24 that has a diameter of less than the threads of the blind bolt 40. The cylindrical mid region 24 extends from a cylindrical rear portion 26 having a diameter that is greater than the threaded portion of the blind bolt 40. A handle 28 extends in a direction perpendicular to the rear portion 26, and a hex key 32 is disposed on the rear most end of the tool 10. The hex key 32 includes a shaft (not shown) that extends down the center of the rear portion 26 and is firmly mounted therein. As the hex key 32 extends away from the rear portion 26, a bend 30 is provided so that the end of the hex key 32 is offset from the center of the tool 10 and is oriented in a direction perpendicular to the length of the tool 10.

The entire tool 10 is made from high-tensile steel (for example, 4140 steel alloy) suitable for the manufacture of tools and demanding environments. The hex key 32 is constructed of a material that is also high-strength and hard. The hex key 32 may be constructed of the material that is stronger than the tool 10 because the hex key 32 will be repeatedly exposed to high torque and wear conditions. Preferably a ⅜ inch hex key is used, but other types of keys could be used as well, such as other polygon shapes, flat screw driver sockets, Philips head sockets, etc.

The dimensions of the tool will be described but should not be interpreted as limiting. The length of the tool 10 from the round tip 34 to the rear end of the rear portion 26 is 13.5 inches, and the diameter of mid region 24 is a 0.665 inches. The distance from the tip 34 to the rear region 26 is 9 inches. The threads 14 are ½ inch diameter threads (nominal major diameter) at a pitch of 13 threads per inch UNC (coarse threads). The width of flat member 20 is 0.100 inch. The diameter of the guide 12 is 0.362 inch and its overall length is 0.550 inch. These dimensions may change depending upon the application for the tool and the bolt. Likewise, the dimensions of the bolt will change depending on the application.

Figure 6:
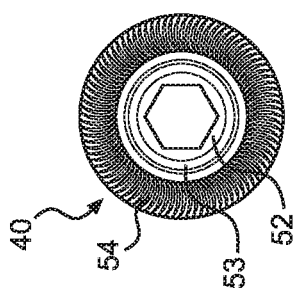
FIG. 6 is an end view of the tip of the bolt showing the receiver, the bolt and the bolt head.
Figure 5:
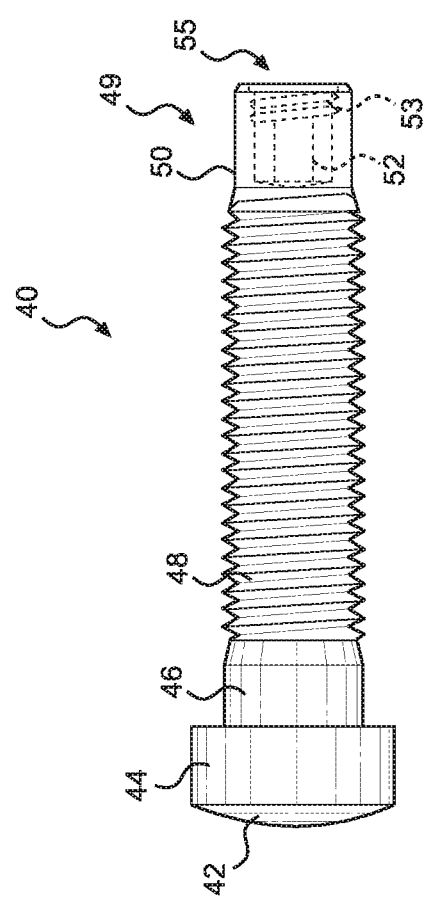
FIG. 5 is a side view of a blind bolt having a receiver formed in the tip of the bolt.
Figure 4:
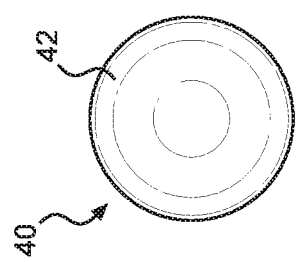
FIG. 4 is an end view of a bolt head.

Referring to FIGS. 4-6, a blind bolt 40 is shown that is used with the tool 10 described above. The bolt 40 includes a bolt head 44 with a round dome 42. A smooth shaft 46 extends away from the bolt head 44 and transitions into a threaded shaft 48. On the tip end of the bolt 40, the threads 48 transition into a smooth cylindrical surface 50 forming the tip end 49 of the bolt 40. A receiver 55 is formed in the tip end 49 and includes an outward end that is threaded with inner threads 53. The inward end of the receiver 55 is a polygon socket 52, preferably a hexagon socket 52 having a width from flat to flat of 0.375 inches. The depth of the receiver 55, as shown, is 0.590 inches, and the threads 53 are ½ inch-13 threads per inch UNC.

Referring to FIG. 6, an end view of the bolt 40 is shown. In this view, lock serrations 54 are shown on the underside of the bolt head 44. Also, it may be seen that the maximum diameter of the hex head 52 is smaller than the minimum diameter of the threads 53.

In operation, the process of mounting the blind bolt 40 through a hole to a structure begins by mounting nuts and washers on the mid region 24. Applying these items from the tip 12, a nut 64 is first placed on the tool 10, then a solid washer 66, and finally a folded washer 68 is placed on the tool 10. The nut 64 and the solid washer 66 are disposed on the mid region 24 adjacent to the rear region 26. The folded washer 68 is mounted on the regions 20 and 22 of the tool 10. Next, the tip 12 is inserted into the receiver 55. The tip 12 is dimensioned to fit within the hex socket 52. The rounded point 34 helps provide an initial alignment of the tip 12 with the receiver 55. As the tip 12 continues to move forward it begins to align the tool 10 as it passes through the threads 53. When the tip 12 enters the hex socket 52, it fits snugly, and thus the interaction between the tip 12 and the hex socket 52 quickly and precisely aligns the tool 10 with the bolt 40. When the threads 14 engage the threads 53, the tool and the bolt are already aligned and it would be difficult if not impossible to cross thread the threads 14 and 53. With approximately a one half turn of the tool 10, the threads 14 and 53 tighten and secure the bolt 40 to the tool 10.

With the bolt 40 mounted on the tool 10 a user is ready to begin the process of inserting the bolt 40 into a structure 70, as shown generally in FIGS. 10-19. First, the bolt head 44 is passed through a hole 72 in the structure 70. The tool 10 is continued forward until a folded washer 68 disposed on the regions 20 and 22 is pushed completely through the hole 72. Then the folded washer 68 is unfolded and the bolt head 44 is moved against the folded washer 68 to pinch the washer against an inside surface of the structure 70. Thus, the bolt head 44 is captured within the structure. At this point, a washer 66 and nut 64 are moved from the tool 10 onto the threaded shaft 48. As the nut 64 is tightened on the shaft 48 eventually it will tighten to a point where the bolt will tend to rotate. Doing so will unscrew the threads 14 and 33. Once these threads are loosened, the tool 10 is quickly removed from the bolt 40 and the hex key 32 is inserted into the hex socket 52. In this configuration, the entire length of the tool 10 may be used as a lever to apply a torque to the bolt 40 while the nut 64 is tightened on the threaded shaft 48 with a wrench. Once a sufficient force or torque has been applied to the nut 64, the hex key 32 is removed from the hex socket 52 and the process is complete.

From the above discussion, it will be appreciated that the disclosed tool 10 is fast, durable, lightweight, easy to operate and strong. The guide tip 34 makes it easy for the user to place the bolt 40 on the tool 10 and create proper alignment. The coarse threads on the tool 10 and the bolt 40 make it quick and easy to securely join the bolt 40 to the tool 10. The hex key 32 and hex socket 52 allow the tool 10 to be reconnected to the bolt 40 in six different positions or orientations and allows the overall length of the tool 10 to be used as a lever when applying torque to the bolt 40. These advantages are most useful in demanding environments. For example a worker at high elevations on a cell tower may conveniently use the tool 10 and bolt 40 to secure equipment and structures to the tower.

Figure 7:
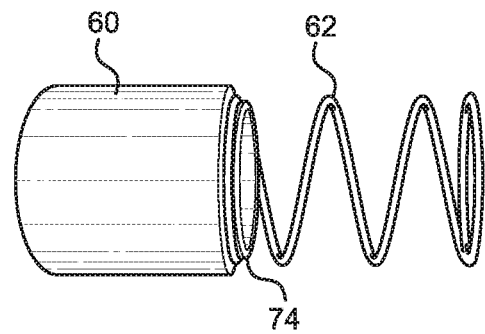
FIG. 7 is a side perspective view of a shear sleeve configured for use in connection with a blind bolt.

Now, with reference to FIG. 7, in certain embodiments, the tool 10 may be provided with a bolt 40 having a sleeve 60 and a spring 62. The spring 62 may be spot welded, glued or otherwise adhesively secured to the sleeve 60. In some embodiments the spring 62 may be separate from the sleeve 60, but positioned to perform the same function as described below. For example, in an alternative embodiment, one end of the shear sleeve 60 may include a flange 74 or other similar structure which functions as a spring retainer. An end of the spring 62 is fitted over this flange 74 so that the spring is thereby fastened to the shear sleeve 60 by the flange 74, without the need for welds, glues, or other adhesives.

Figure 8:
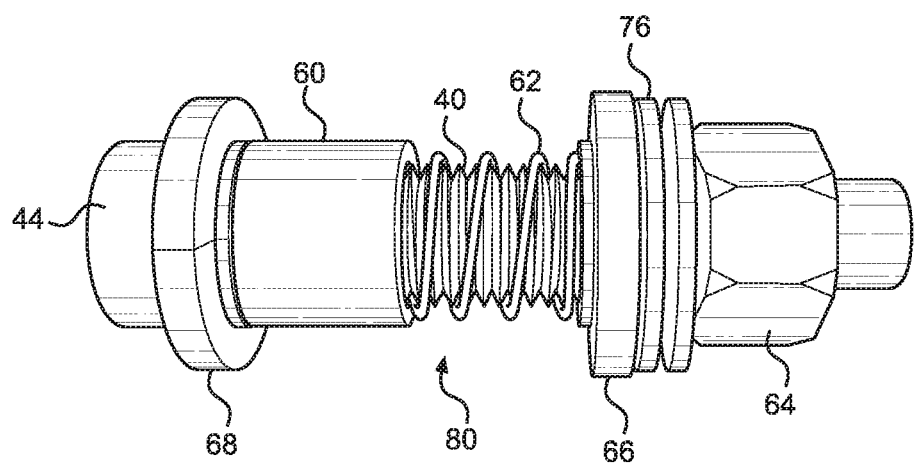
FIG. 8 is a side perspective view of a shear sleeve located on a blind bolt.
Figure 9:
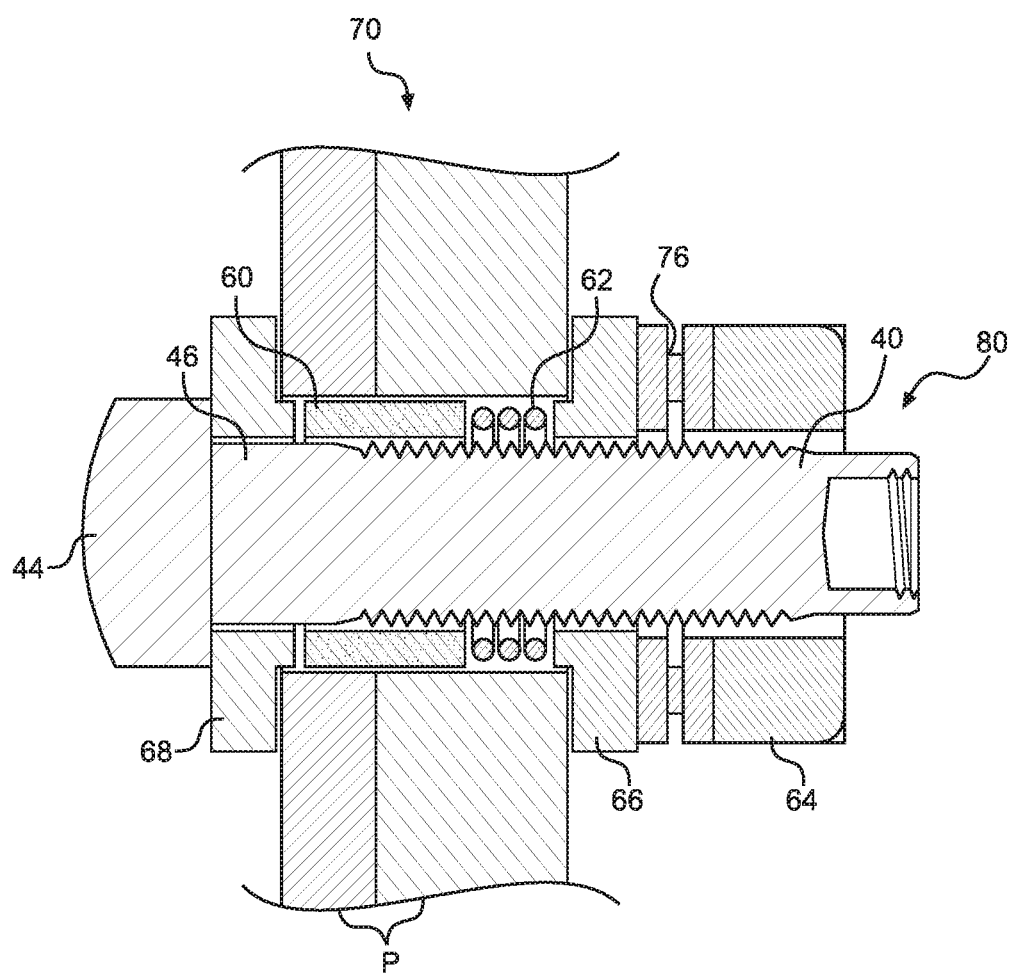
FIG. 9 is a cross-sectional view of blind bolt and shear sleeve in combination inserted into a structure having adjacent plates.

The metallic sleeve 60 and spring 62 are preferably galvanized, powder coated or otherwise made rust proof. In combination, the sleeve 60 and spring 62 form a spring-loaded shear sleeve that may be used to protect the bolt 40 against sheer forces present when adjacent plates of the structure 70 shift with respect to one another. The spring 62 acts as a spring positioner because it positions the sleeve 60 within a bore or hole at the seam or interface of two plates. As shown in FIGS. 8 and 9, the sleeve 60 and spring 62 may be inserted onto the blind bolt between the folded washer 68 and the solid washer 66. Preferably, the spring 62 and sleeve 60 are sized so that they contact the inward facing surfaces of the folded and solid washers 66, 68. The inside diameter of the sleeve 60 and spring 68 are sized slightly larger than the outer diameter of the threads of the blind bolt 40 so that the sleeve 60 and spring 68 slide easily onto the bolt 40.

As shown best in FIG. 9, when a bolt 40 is inserted into a structure 70 having adjacent plates P, one plate may sometimes shift position with respect to the other plate, thereby causing a shearing force. This shearing force may cause the bolt 40 to be damaged or to fail entirely. Accordingly, the spring-loaded shear sleeve acts to protect the bolt 40 against these shear forces. In particular, the sleeve 60 is configured to surround the bolt 40 and to straddle the intersection between the two adjacent plates P.

If a sleeve 60 were placed over the bolt 40 by itself, it may not be correctly located within the hole or bore (i.e., straddling the intersection of the plates) to protect the bolt 40. One reason for this is that the sleeve 60 might slide to the opposite end of the bolt 40 where it no longer straddles the intersection. One reason that the sleeve 60 may not be correctly positioned is that the thickness of plates may vary from one application to the next and, for thicker plates the sleeve might slide to the opposite end of the bolt where it no longer straddles the intersection. For this reason, the spring 62 contacts one washer and causes the sleeve 60 to be pressed against the opposite washer. As long as the sleeve 60 is sufficiently long to extend from the inside of that washer to the intersection, it will be automatically located in the correct location when the spring 62 and sleeve are compressed between the washers 66, 68.

FIG. 9 further illustrates the use of a squirter washer 76 (sometimes referred to as a direct tension indicator washer) in connection with a blind bolt 40 and sleeve and spring. The squirter washer 76 includes embedded silicone that squirts out of the washer when the desire amount of torque is applied to the washer 76.

With further reference to FIGS. 8 and 9, the overall blind bolt assembly 80 for fastening a blind bolt 40 in a hole 72 in a structure 70 having only one accessible side may be seen. The overall assembly 80 includes the blind bolt 40, a foldable split washer 68, a shear sleeve 60, a spring 62, a flat washer 66, a direct tension indicator washer 76 and a nut 64. The assembly may also optionally include a lock washer. Each of the washers 66, 68, 76, the shear sleeve 60, and the spring 62 are coaxially disposed about the bolt shaft 46. A portion of the flat washer 66 and folded washer 68 may extend partially into the hole 72 in the structure 70 in order to center the washers on the bolt 40 and within the hole. The nut 64 is threaded onto the bolt shaft 46. As seen in FIG. 9, when the blind bolt assembly 80 is attached to the structure 70, the bolt 40 extends through a hole in the structure. The bolt head 44 and the foldable split washer 68 are disposed on an inaccessible side of the structure. At least a portion of the shear sleeve 60 and the spring 62 are disposed within the hole in the structure. Finally, the nut 64 and the at least one non-folding washer are disposed on an accessible side of the structure 70.

Figure 11:
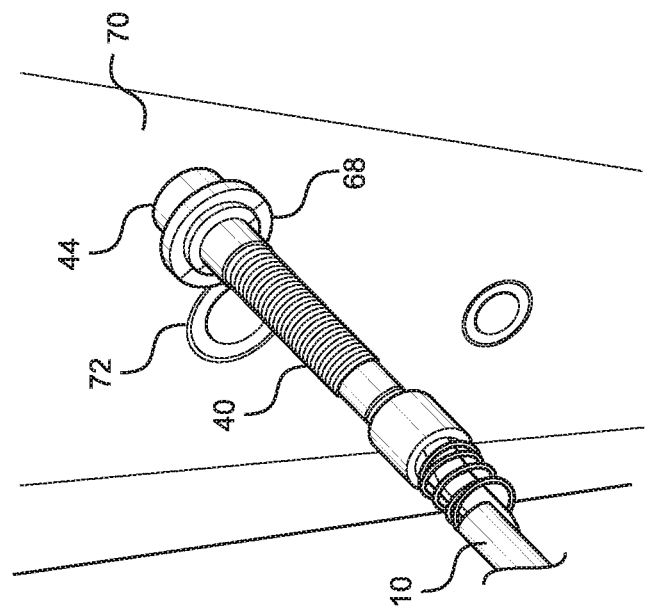
FIGS. 10-19 illustrate the process of installing a blind bolt having a shear sleeve into a structure having adjacent plates.
Figure 10:
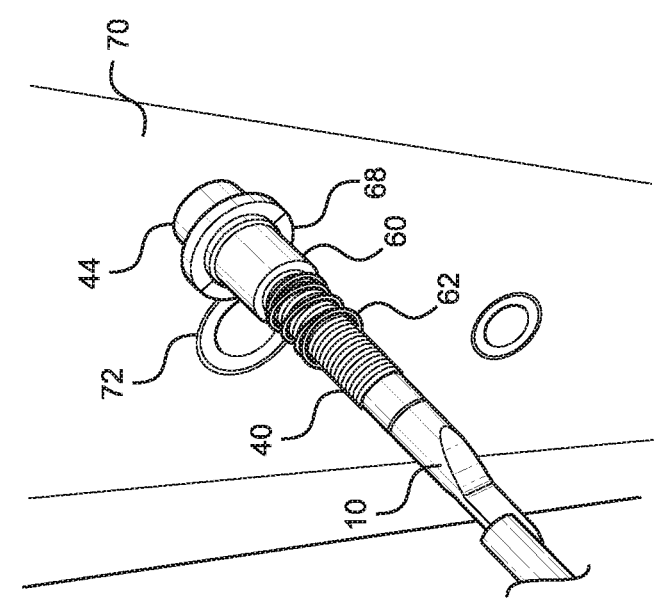
Figure 13:
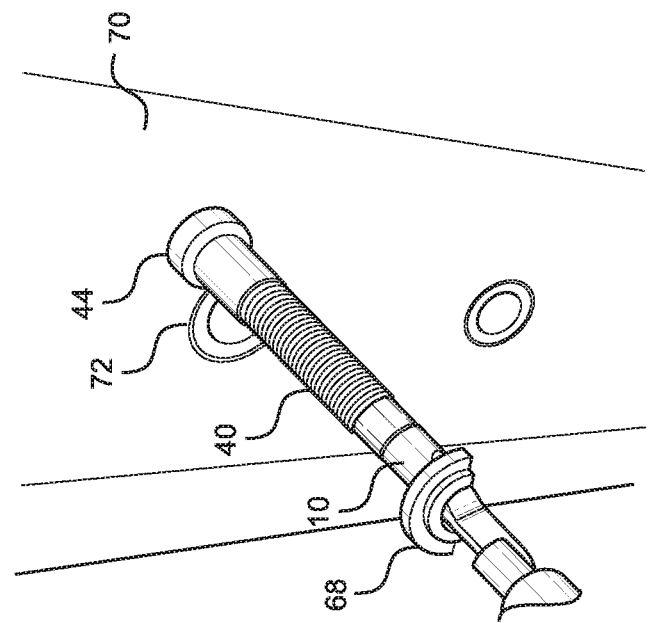
Figure 12:
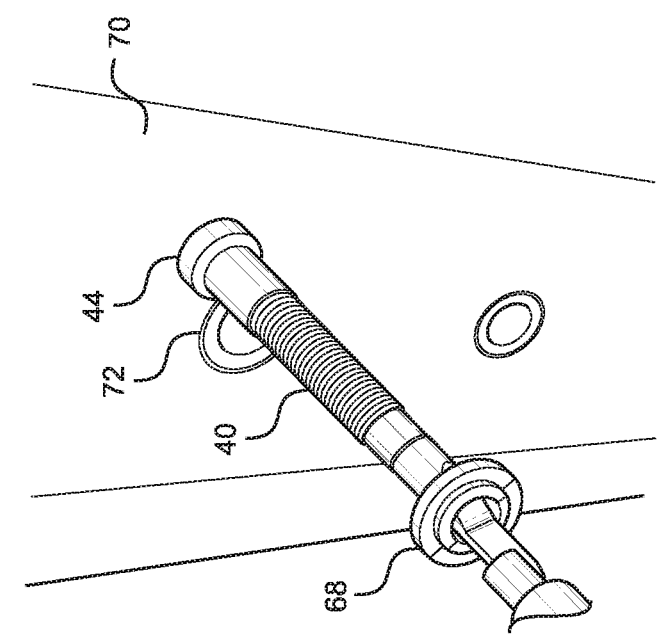
Figure 15:
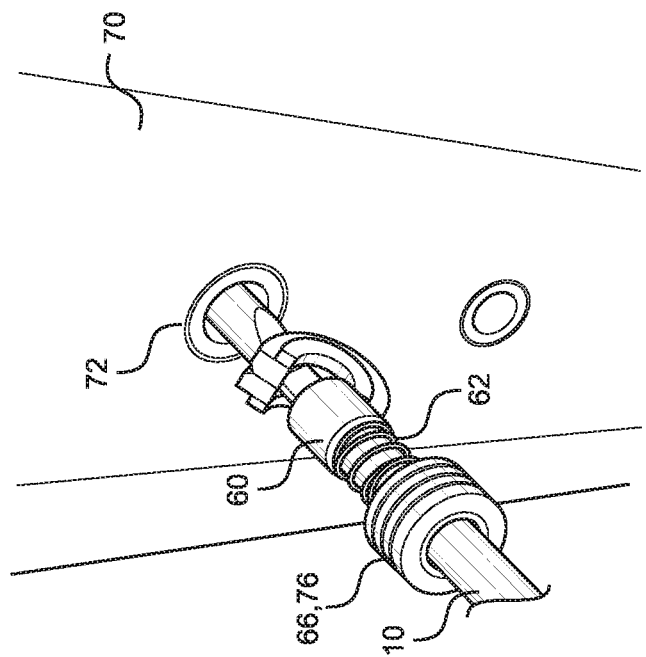
Figure 14:
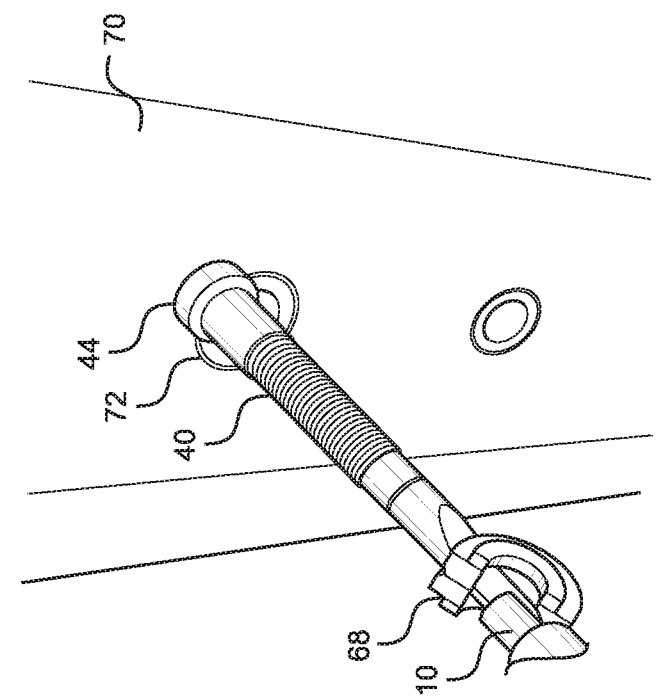
Figure 17:
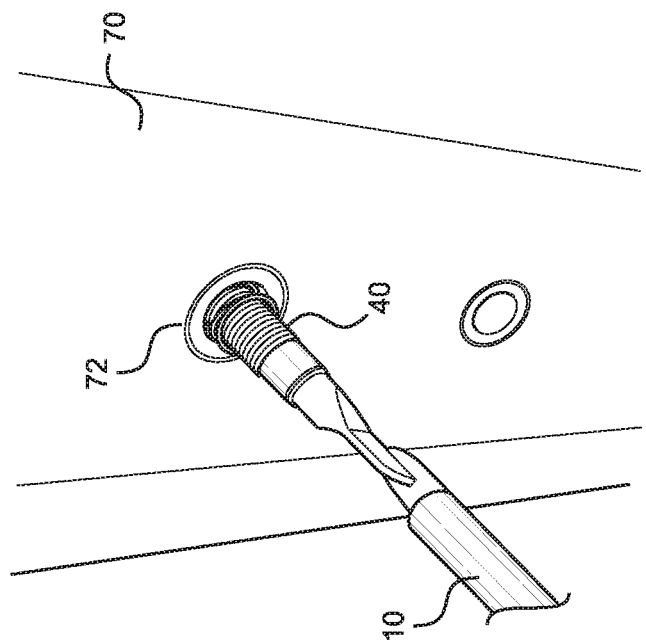
Figure 16:
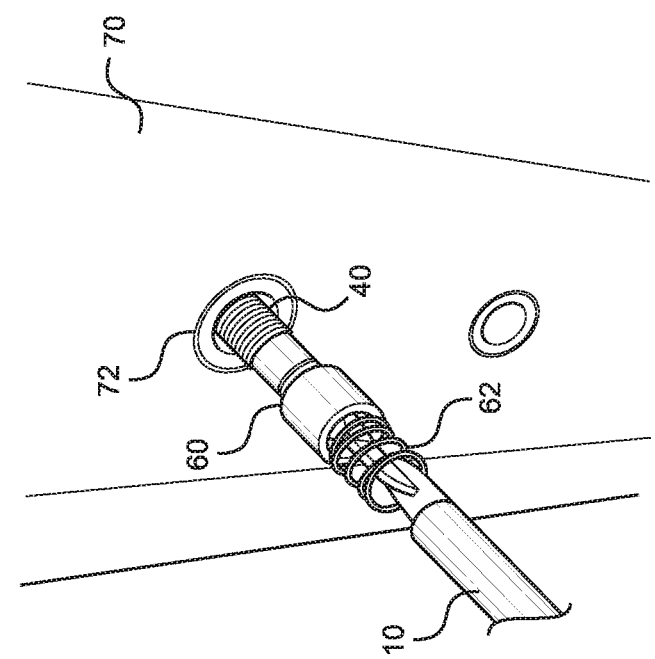
Figure 19:
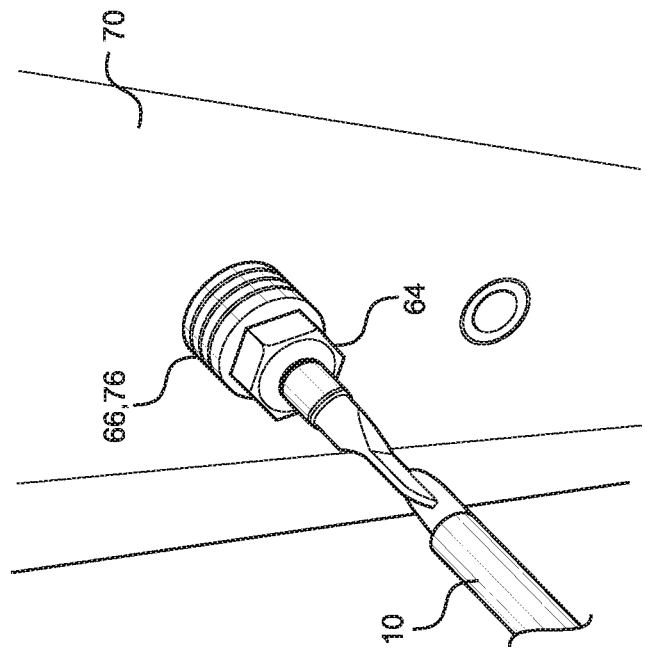
Figure 18:
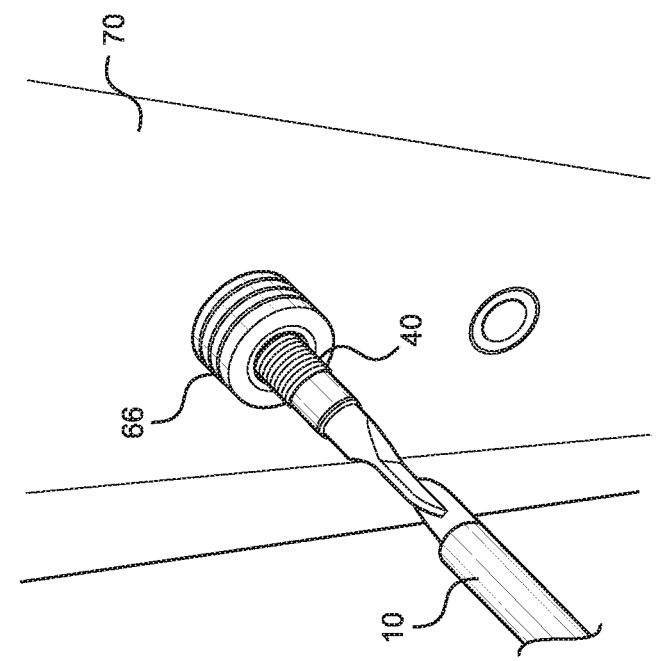

FIGS. 10-19 illustrate one embodiment of a blind bolt 40 including a spring positioner being inserted into a structure in the manner described above. As seen in FIGS. 10 and 11, a blind bolt 40, along with other components of the blind bolt assembly 80 are attached to the tool 10. The spring 62 and shear sleeve 60 are then positioned on the tool 10. The foldable split washer 68 is also folded and positioned on the tool 10, as may be seen in FIGS. 12-14. The bolt 40 is then inserted into a hole 72 in the structure 70. First, the bolt head 44 is passed through the hole 72, as shown in FIG. 15. The tool 10 is continued forward until a folded washer 68 disposed on the regions 20 and 22 (FIG. 1) is pushed completely through the hole 72, as seen in FIG. 16. Then, the folded washer 68 is unfolded and the bolt head 44 is moved against the folded washer 68 to pinch the washer against the structure 70. The shear sleeve 60 and spring 62 are also inserted into the hole 72, as shown in FIG. 17. Lastly, the non-folding washers 66, 76 are moved from the tool 10 onto the bolt 40, as shown in FIG. 18, and the nut 64 is threaded onto the bolt and tightened as shown in FIG. 19.

Figure 21:
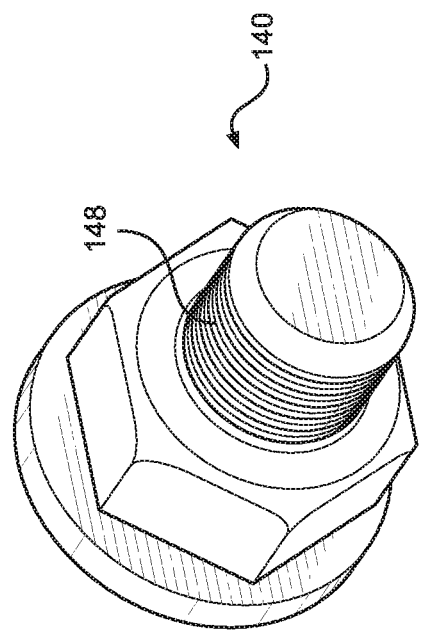
FIGS. 20 & 21 are side perspective views of a blind bolt having splines adapted for use with a tension control wrench according to one embodiment of the present disclosure.
Figure 20:
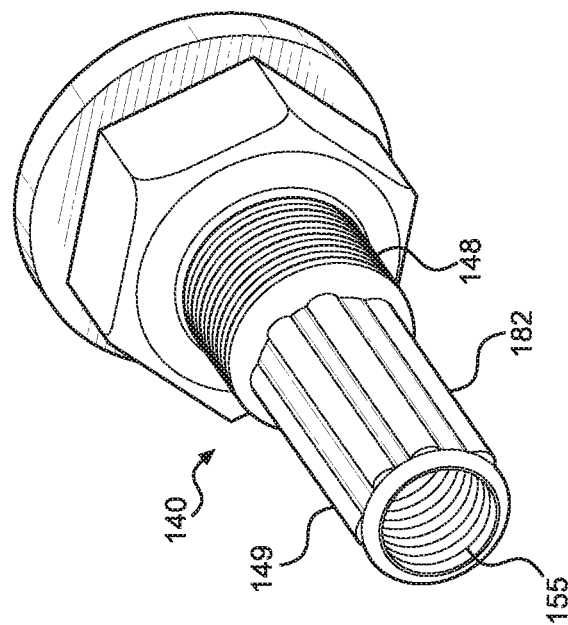

In an alternative embodiment of the present disclosure, a blind bolt 140 adapted for tightening using a tension control wrench instead of the hex wrench discussed previously may be used. Similar to the blind bolt 40 discussed above, and as shown in FIGS. 20 and 21, the blind bolt 140 includes a bolt head, a bolt shaft extending from the bolt head to a tip end 149 of the shaft, bolt threads 148 formed on the bolt shaft, and a receiver 155 formed in the tip end of the bolt shaft. The receiver 155 has an outward end disposed proximate to the tip end 149 of the bolt shaft and an inward end disposed within the bolt shaft toward the bolt head from the tip end. In addition, the blind bolt 140 also includes receiver threads formed proximate the outward end of the receiver 155 and a driven structure formed in the inward end of the receiver. In addition, according this embodiment, the blind bolt 140 also includes a plurality of splines 182 formed on an outer surface of the tip end 149, which are configured to engage with an inner socket of a tension control wrench. Moreover, the tip end 149 of the bolt shaft is configured to break or shear away from the bolt 140 when a predetermined amount of torque is applied to the plurality of splines 182 on the tip end 149, as seen in FIG. 21.

Thus, the final tightening of the nut on the blind bolt 140 may be accomplished using a tension control wrench, which includes both an inner socket which engages with the splines 182 of the tip end 149 and an outer socket which engages nut threaded onto the bolt. A torque is applied to the nut by the outer socket while the inner socket holds the splines 182 of the tip end 149 stationary, or applies an opposite torque, thus tightening the nut on the blind bolt. When a predetermined amount of torque is applied, the tip end 149 of the bolt 140 shaft will shear away from the bolt. In this manner, a plurality of blind bolts and nuts may be tightened to a more consistent and uniform torque.

In a variation of the above embodiment, the nut may be tightened on the blind bolt without breaking away the tip end 149. In this variation, a tension control wrench is used that slips when a predetermined amount of torque is applied between the inner socket and the outer socket. When the nut is tightened, the tension control wrench applies a torque to the nut using the outer socket and applies an opposite torque to the splined tip end 149 with the inner socket. The applied torque will increase until the predetermined amount of torque is applied between the inner and outer sockets. Then, the wrench will begin to slip and will not increase the amount of torque. Thus, a predetermined torque is applied to the nut, and assuming the predetermined amount of torque is less than the breakaway torque of the tip, the tip will not be sheared away by the tension control wrench. In this embodiment, the blind bolt could be removed by using the tension control wrench to apply opposite torques using the inner and outer sockets. Thus, theoretically, the blind bolt could be easily removed, inspected and reused or replaced. However, one advantage of the breakaway tip would be lost. When a blind bolt is observed with the tip broken away, an inspector can be assured that the proper torque was applied to the nut when the bolt was installed. If the tip is not broken away, an inspector loses that assurance.

Figures 22A, 22B:
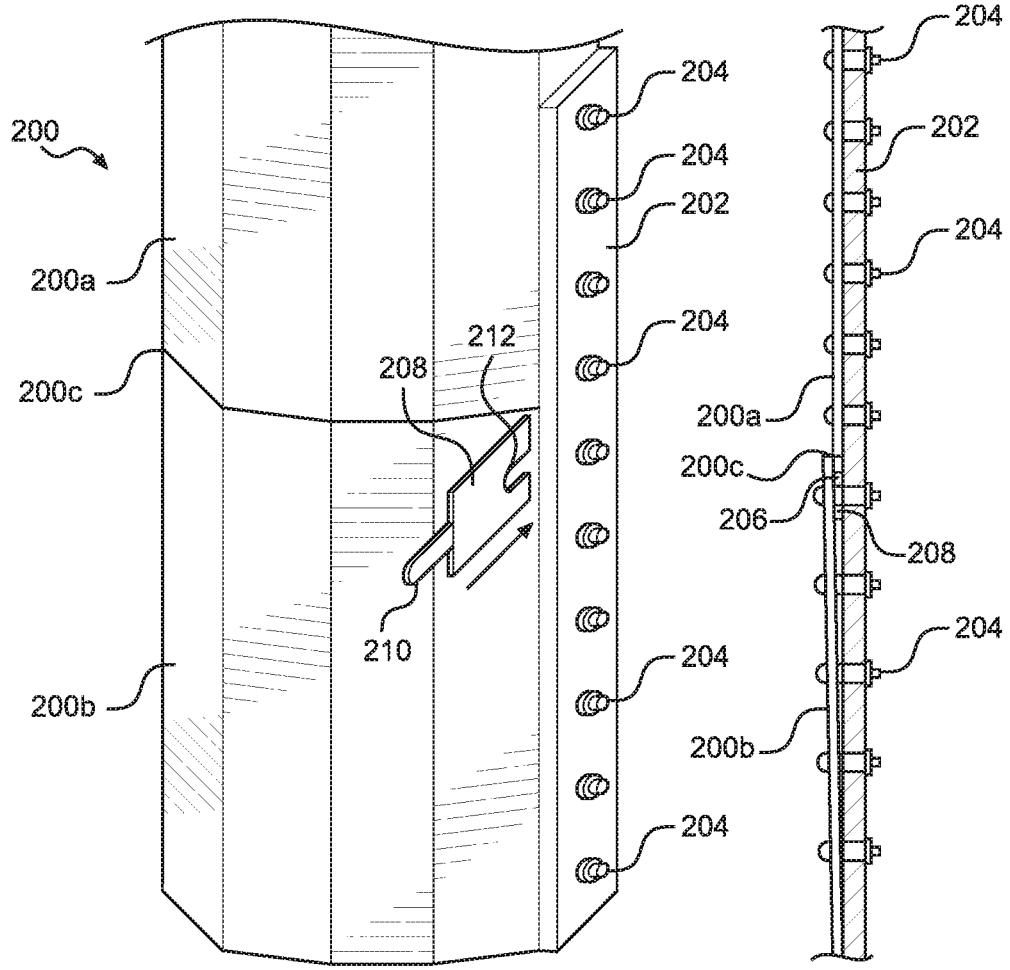
FIG. 22a is an isometric drawing of a cell tower pole with a reinforcement plate being installed on the pole using a shim.
FIG. 22b is a side elevation view of a cell tower pole with a reinforcement plate being installed on the pole using a shim.

Referring now to FIGS. 22*a* and 22*b*, there is shown two views of a reinforcement plate 202 mounted on a pole 200 illustrating another aspect of the present invention. FIG. 23*a* is an isometric three-dimensional view, and FIG. 23*b* is a somewhat diagrammatic side elevation, cross sectional view. The reinforcing plate 202 is held to the pole 200 by blind bolts 204, and a shim 208 is positioned between the plate 202 and the pole 200 to ensure that the plate 202 remains relatively straight even if the pole 200 has variations in its surface configuration. The shim 208 includes a breakaway tab 210 that is held by the user to insert the shim 208 into place. In addition, the shim 208 includes a slot 212 that is dimensioned to encompass and surround the blind bolt 204 once the shim is inserted fully into position behind the plate 202.

Figure 23:
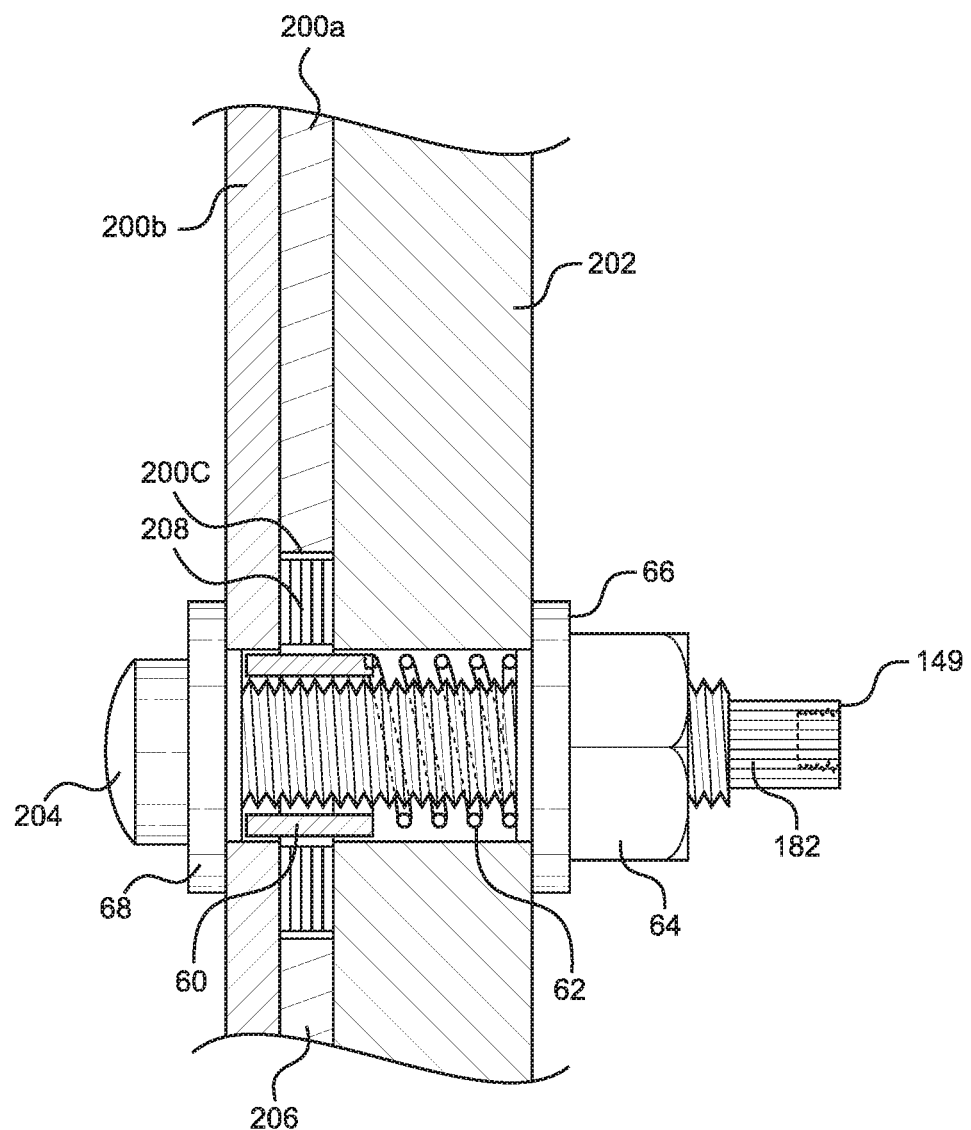
FIG. 23 is a somewhat diagrammatic cross-sectional view of a cell tower pole with a reinforcement plate mounted thereon using a blind bolt and a shim.

As best shown in FIG. 23, the pole 200 is constructed in two parts, namely, pole 200*a* and pole 200*b*. Pole 200*a* is disposed on the exterior of pole 200*b* and thus the poles 200*a* and 200*b* have a slightly different diameter. The outside diameter of 200*a* is equal to the inside diameter of 200*b*, and thus there is a surface irregularity at the intersection 200*c* of the two poles 200*a* and 200*b*. Because of the surface irregularity at the intersection 200*c*, a gap 206 is formed between the plate 202 and the pole 200*b*. To maintain the straight shape of the plate 202, a shim 208 is placed into the gap 206. By using the shim 208 in one or more gaps between the plate 202 and the pole 200*b*, the appearance of a straight reinforcing plate 202 is created. In reality, the reinforcing plate must bend slightly to conform to the overall shape of the pole 200, but the shims create a gradual bend in the plate 202 which is less objectionable. Thus, the plate 202 will appear straight or less wavy than would otherwise be possible without the shims 208.

A cross-sectional view of the blind bolt 204 utilizing the shim 208 is shown in FIG. 23. In this view, it may be appreciated that the blind bolt 204 is assembled in a manner previously described with respect to prior embodiments with a folded washer 68 disposed on the interior of the pole 200*a* and a solid washer 66 disposed on the bolt 204 on the exterior side of the plate 202. A nut 64 is threaded onto the bolt 200 to hold the entire assembly in place. In this view, the sheer sleeve 60 is disposed at the intersection of the plates 200*a* and 200*b* and at the intersection of plate 200*a* and the reinforcing plate 202, and thus the sheer sleeve 60 will resist and absorb shear forces between the various structures at the aforementioned intersections. In particular, any shear movement of the plate 202 with respect to the pole 200*a* will be resisted by the sheer sleeve 60. The spring 62 will initially position the sheer sleeve 60 into a proper position for resisting shear forces, and it will hold the sheer sleeve 60 in proper position throughout the life of the structure.

In this view, it may be appreciated that the shim 208 occupies a gap 206 that is formed between the reinforcing plate 202 and the pole 200*b*. Without the shim 208, the bolt 204 would tend to bend the reinforcing plate 202 slightly at the point of intersection 200*c* between the poles 200*a* and 200*b*. It addition, more bolts 204 would be placed through the pole 200*b* and the plate 202 at positions below the bolt 204 shown in FIG. 23. Each additional bolt 204 through the gap 206 will also be placed with a shim 208 in the gap 206 so that the pressure applied by the bolts will not tend to bend the reinforcing plate 202 and create a wavy or bent shape. The shims 208 will allow the plate 202 to gradually conform to the overall shape of the pole 200 without giving the appearance of being wavy or bent.

Figure 24:
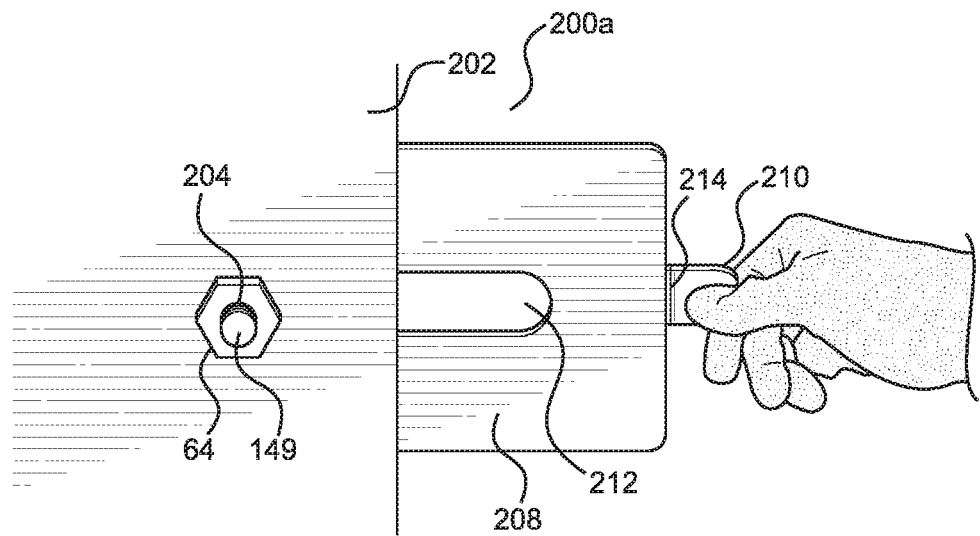
FIGS. 24-27 are front perspective views of a reinforcement plate being mounted on a cell tower pole with a shim being inserted between the plate and the pole such that the shim will surround a blind bolt.
Figure 25:
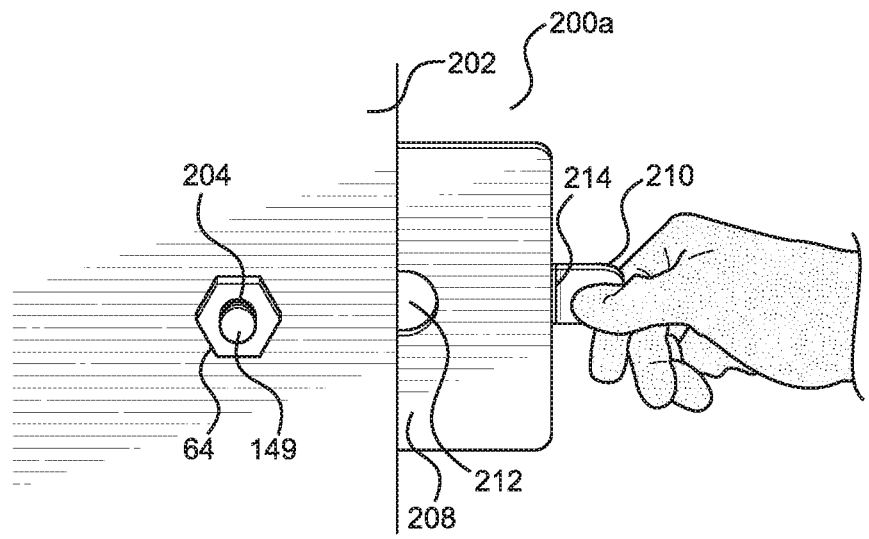
Figure 26:
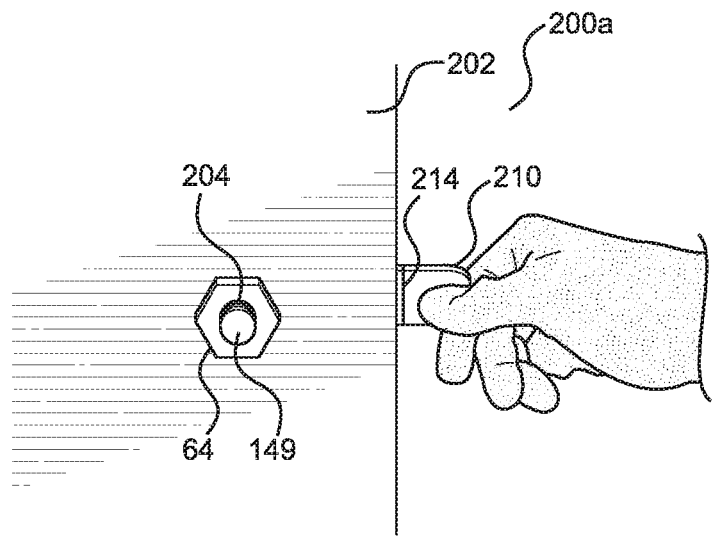
Figure 27:
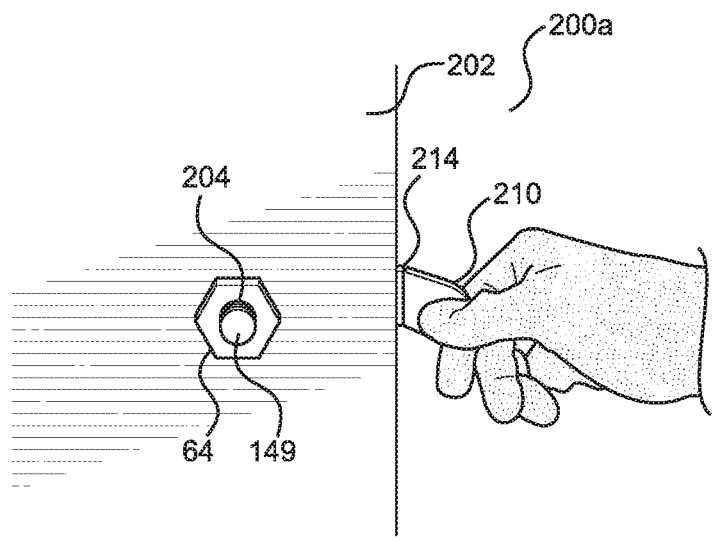

In FIGS. 24-27 the shim 208 is being installed on the exterior surface of a pole 200*a* adjacent to the interior of a reinforcement plate 202. In these views, the tip end 149 of the blind bolt 204 is visible with the nut 64 securing the bolt 204 to the plate 202. In FIG. 24, the shim 208 is shown immediately after its left edge is first inserted beneath the plate 202 in the gap 206 shown in previous drawings. The slot 212 is aligned with the bolt 204 so that the slot 212 will slide over and encompass the bolt as previously described. In FIG. 25, the shim 208 has been moved to the left and the slot 212 has now begun to encompass the bolt 204. The shim 208 is held in position by a user who is grasping the tab 210. In FIG. 26, the shim 208 has been completely inserted behind the plate 202 and only the tab 210 remains visible. When the plate is in the position shown in FIG. 26, the nut 64 is tightened at least enough to firmly secure the shim 208 in place. Then, the tab 210 is bent forward and back to weaken the metal attaching the tab 210 to the shim 208 until it breaks cleanly in a line formed by the right-hand edge of the shim 208. As will be described hereafter, the tab 210 includes a weakened structure extending along a line defined by the edge of the shim 208. This weakened structure may be a score or a crease. After the tab 210 is moved forward and backwards until it breaks, the shim 208 will be firmly secured in position behind the plate 202 with no portion of the shim being visible in the plan views shown in FIG. 27.

The shim 208 may be constructed in different sizes and different thicknesses depending upon the particular application. The dimensions of various exemplary shims 208 will be described but should not be interpreted as limiting. The shims 208 are generally square in shape and may have dimensions ranging from 4 by 4 inches to 8.5 by 8.5 inches. The slot 212 of the shims 208 has an opening width of about 1.118 inches and a depth that ranges from about 2.59375 inches to about 4.84375 inches. The tabs 210 of the shims 208 are approximately 1.188 inches wide and about 1.188 inches to about 2.188 inches long. Larger shims 208 preferably have larger tabs 210. In the embodiment shown in FIGS. 24-27, the shim 208 has a thickness of about $\frac{1}{16}$ inch, but the shims may have a variety of thicknesses depending upon a particular application. The material of the shims 208 may also change depending upon the application. In the case of a cell tower application, the preferred material is galvanized steel. However, the shims may also be constructed of brass, copper, aluminum, stainless steel, rust resistant steel and other metals. In some applications, nonconductive nonmetallic materials may be preferred such as nylon, polyester, polypropylene, other polymers, rubber and synthetic rubber.

A particularly useful feature of the shim 208 is a weakened structure 214, which is disposed along a line that is co-linear with the right edge of the shim 208 as shown in FIGS. 24 and 25. The weakened structure 214 may be a score, a crease, a crimp, perforations or some other weakening structure. The weakened structure 214 assists in the removal of the tab 210 once the shim 208 is properly held in place by compression between plates, for example. When the tab 210 is moved forward and backwards along a line of rotation through the weakened structure 214, fatigue rapidly causes the tab to break away from the shim 208. Thus, the tab 210 functions to assist the user in holding and positioning the shim 208 during installation and then easily breaks away so that the exterior appearance of the overall structure remains pleasing and uncluttered.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A blind bolt for extending through a hole, the hole having a diameter, a length, a proximate end and a distal end, the hole extending through a first member and a second member with a surface formed on the second member adjacent the distal end of the hole, and with an interface between the first member and the second member, the blind bolt comprising:
   a blind bolt shaft having a length greater than the length of the hole and having a distal end and a proximate end with threads formed on the blind bolt shaft adjacent the proximate end;
   a blind bolt head on the distal end of the blind bolt shaft, the blind bolt head having a diameter that is smaller than the diameter of the hole;
   a folding washer being foldable along a fold line for being disposed on the distal end of the threaded blind bolt shaft between the blind bolt head and the surface on the second member, the folding washer having a folded configuration with a dimension and configuration such that it may pass through the hole and having an unfolded configuration with a diameter greater than the diameter of the hole and configured such that it may not pass through the hole;
   a shear sleeve disposed on the blind bolt shaft proximate the distal end of the blind bolt shaft and having a length dimension sufficient to extend from the surface of the second member, across the interface between the first and second members, and into the first member;
   a nut threaded on the threads of the blind bolt shaft; and
   a compressible coil disposed on the blind bolt shaft between the shear sleeve and the nut;
   the compressible coil and the shear sleeve having a combined length such that, when the folded washer is in the unfolded configuration between the head and the surface, the shear sleeve and the compressible coil are positioned within the hole, and the nut is being tightened, the compressible coil is compressed and creates a force pushing the shear sleeve, the shear sleeve being dimensioned to slide on the blind bolt shaft within the hole in response to the force of the compressible coil, and the compressible coil being dimensioned and configured to transmit a force from the nut as it is tightened to slide the shear sleeve to a position extending across the interface.

2. The blind bolt of claim 1 wherein the compressible coil is a coil metal spring.

3. The blind bolt of claim 2 further comprising a washer disposed on the blind bolt shaft between the nut and the coil metal spring.

4. The blind bolt of claim 1 wherein the compressible coil is a spring.

5. The blind bolt of claim 1 further comprising a washer disposed on the blind bolt shaft between the nut and the compressible coil.

6. The blind bolt of claim 1 where the compressible coil is secured to the shear sleeve.

7. The blind bolt of claim 1 where the compressible coil is not secured to the shear sleeve.

8. The blind bold of claim 1 wherein the shear sleeve is continuous around its circumference.

9. The blind bolt of claim 1 wherein the combined length of the shear sleeve and the compressible coil is greater than the length of the hole.

* * * * *